United States Patent
Hirose et al.

(10) Patent No.: US 10,418,627 B2
(45) Date of Patent: Sep. 17, 2019

(54) NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE MATERIAL FOR NON-AQUEOUS ELECTROLYTE SECONDARY BATTERY

(71) Applicant: SHIN-ETSU CHEMICAL CO., LTD., Tokyo (JP)

(72) Inventors: Takakazu Hirose, Annaka (JP); Hiromichi Kamo, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 103 days.

(21) Appl. No.: 15/580,556

(22) PCT Filed: May 10, 2016

(86) PCT No.: PCT/JP2016/002272
§ 371 (c)(1),
(2) Date: Dec. 7, 2017

(87) PCT Pub. No.: WO2016/203696
PCT Pub. Date: Dec. 22, 2016

(65) Prior Publication Data
US 2018/0175377 A1    Jun. 21, 2018

(30) Foreign Application Priority Data
Jun. 17, 2015  (JP) ................................ 2015-122147

(51) Int. Cl.
*H01M 4/134*    (2010.01)
*H01M 4/38*     (2006.01)
(Continued)

(52) U.S. Cl.
CPC .......... *H01M 4/366* (2013.01); *C01B 32/205* (2017.08); *C01B 33/32* (2013.01); *C01F 7/36* (2013.01);
(Continued)

(58) Field of Classification Search
CPC .............................. H01M 4/134; H01M 4/386
See application file for complete search history.

(56) References Cited

U.S. PATENT DOCUMENTS 5,395,711 A    3/1995  Tahara et al.
7,459,236 B2  12/2008  Konishiike et al.
(Continued)

FOREIGN PATENT DOCUMENTS

EP    2372817 A1    10/2011
JP    2997741 B2     1/2000
(Continued)

OTHER PUBLICATIONS

Aug. 9, 2016 International Search Report issued in International Application No. PCT/JP2016/002272.
(Continued)

*Primary Examiner* — Jonathan Crepeau
(74) *Attorney, Agent, or Firm* — Oliff PLC

(57) ABSTRACT

A negative electrode active material for a non-aqueous electrolyte secondary battery, includes: negative electrode active material particles that contain a silicon compound ($SiO_x$: $0.5 \leq x \leq 1.6$) containing a Li compound, wherein the silicon compound is at least partially coated with a carbon coating, and at least a part of a surface of the silicon compound, a surface of the carbon coating, or both of them are coated with a composite layer that contains a composite composed of amorphous metal oxide and metal hydroxide. This provides a negative electrode active material for a non-aqueous electrolyte secondary battery that is highly
(Continued)

stable in aqueous slurry, having a high capacity, favorable cycle performance and first efficiency.

20 Claims, 3 Drawing Sheets

(51) Int. Cl.

| | |
|---|---|
| H01M 4/133 | (2010.01) |
| H01M 4/1393 | (2010.01) |
| H01M 4/1395 | (2010.01) |
| H01M 4/587 | (2010.01) |
| H01M 4/36 | (2006.01) |
| C01B 33/32 | (2006.01) |
| C01B 32/205 | (2017.01) |
| C01F 7/36 | (2006.01) |
| H01M 4/48 | (2010.01) |
| H01M 4/131 | (2010.01) |
| H01M 4/139 | (2010.01) |
| H01M 4/1391 | (2010.01) |
| H01M 4/485 | (2010.01) |
| H01M 4/62 | (2006.01) |
| H01M 4/02 | (2006.01) |
| H01M 4/04 | (2006.01) |

(52) U.S. Cl.
CPC ........... *H01M 4/131* (2013.01); *H01M 4/133* (2013.01); *H01M 4/139* (2013.01); *H01M 4/1391* (2013.01); *H01M 4/1393* (2013.01); *H01M 4/1395* (2013.01); *H01M 4/364* (2013.01); *H01M 4/386* (2013.01); *H01M 4/483* (2013.01); *H01M 4/485* (2013.01); *H01M 4/587* (2013.01); *H01M 4/62* (2013.01); *H01M 4/625* (2013.01); *C01P 2004/80* (2013.01); *C01P 2006/40* (2013.01); *H01M 4/0428* (2013.01); *H01M 4/0459* (2013.01); *H01M 4/0471* (2013.01); *H01M 2004/027* (2013.01)

(56) References Cited

U.S. PATENT DOCUMENTS

| | | | |
|---|---|---|---|
| 8,377,592 | B2 | 2/2013 | Jeong et al. |
| 8,741,481 | B2 * | 6/2014 | Fujii .................. H01M 4/02 |
| | | | 429/209 |
| 2006/0099507 | A1 | 5/2006 | Kogetsu et al. |
| 2008/0176137 | A1 | 7/2008 | Endo et al. |
| 2009/0202911 | A1 | 8/2009 | Fukuoka et al. |
| 2010/0055563 | A1 | 3/2010 | Nakanishi et al. |
| 2010/0075227 | A1 | 3/2010 | Morita et al. |
| 2011/0086271 | A1 | 4/2011 | Lee et al. |
| 2011/0244334 | A1 | 10/2011 | Kawada |
| 2012/0321949 | A1 | 12/2012 | Kawakami et al. |
| 2013/0280614 | A1 | 10/2013 | Lee et al. |
| 2015/0140359 | A1 | 5/2015 | Park et al. |
| 2015/0243972 | A1 * | 8/2015 | Ito .................... H01M 4/366 |
| | | | 429/219 |

FOREIGN PATENT DOCUMENTS

| | | |
|---|---|---|
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-164104 A | 7/2009 |
| JP | 2009-205950 A | 9/2009 |
| JP | 2009-212074 A | 9/2009 |
| JP | 2010-073651 A | 4/2010 |
| JP | 2010-092830 A | 4/2010 |
| JP | 2015-99775 A | 5/2015 |
| WO | 2013/047024 A1 | 4/2013 |

OTHER PUBLICATIONS

Feb. 19, 2019 extended Search Report issued in European Patent Application No. 16811177.1.

* cited by examiner

[FIG. 1]
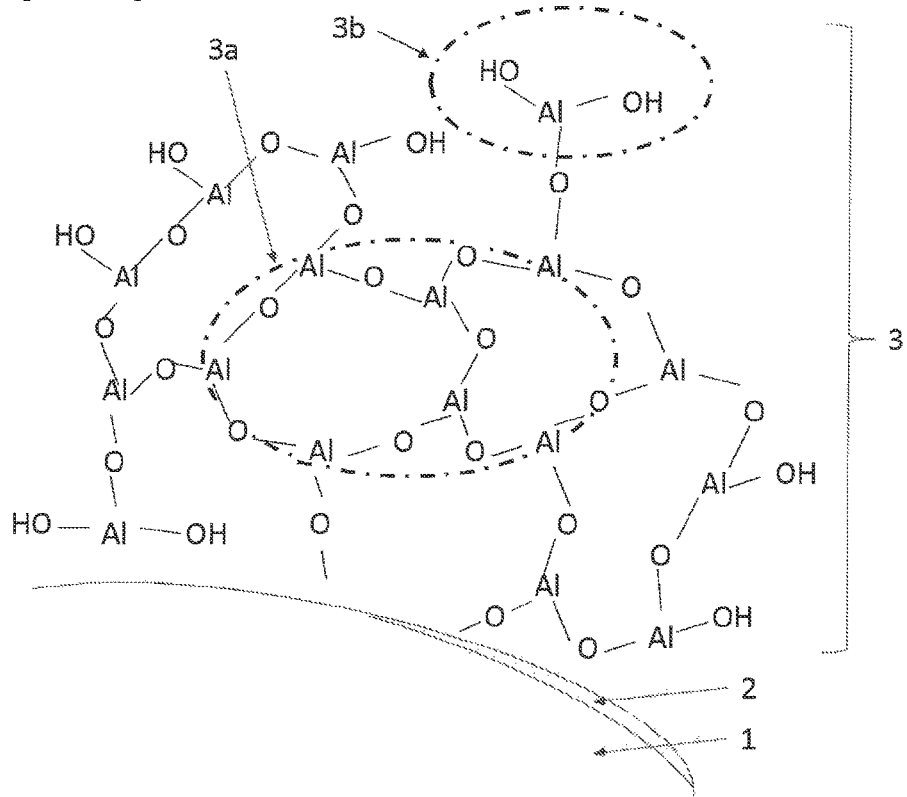
[FIG. 2]
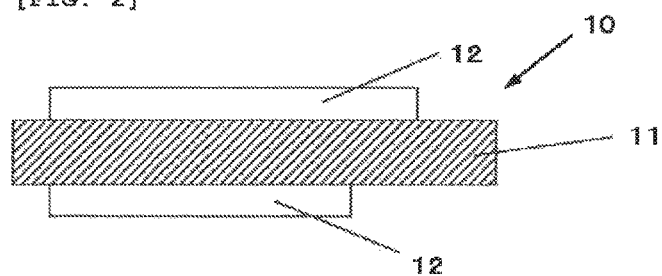

[FIG. 3]
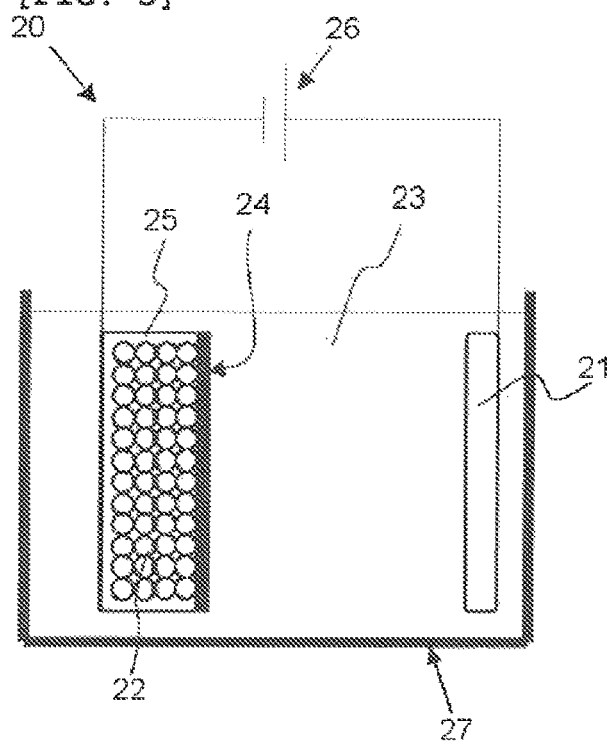
[FIG. 4]
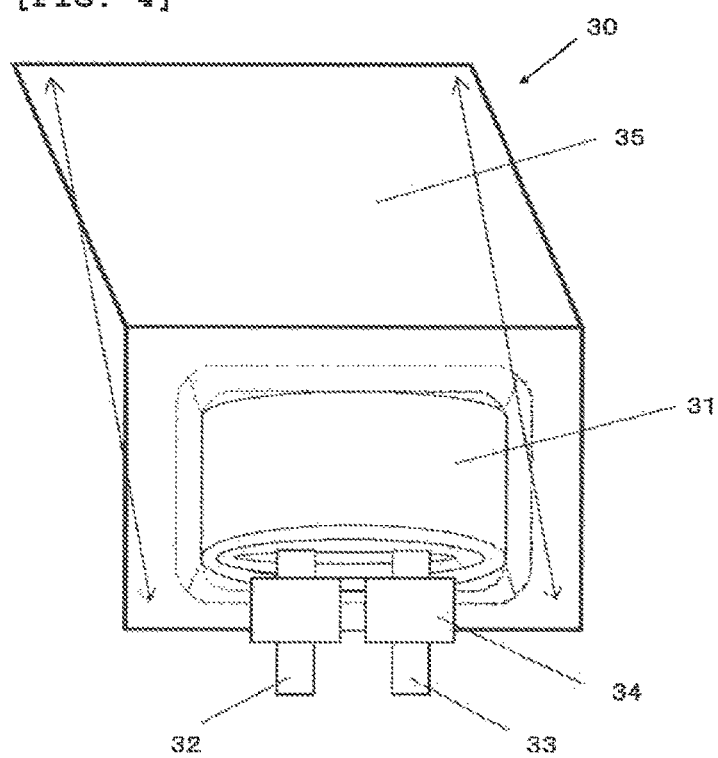

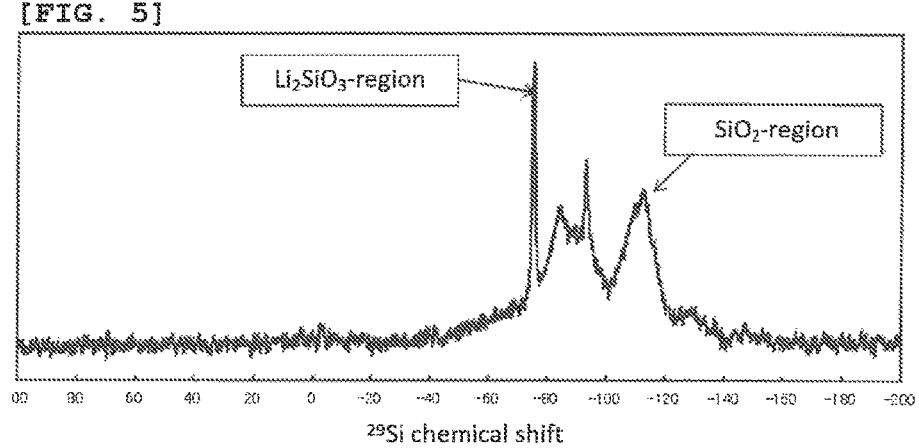
[FIG. 5]

NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD OF PRODUCING NEGATIVE ELECTRODE MATERIAL FOR NON-AQUEOUS ELECTROLYTE SECONDARY BATTERY

TECHNICAL FIELD

The present invention relates to a negative electrode active material for a non-aqueous electrolyte secondary battery, a non-aqueous electrolyte secondary battery, and a method of producing a negative electrode material for a non-aqueous electrolyte secondary battery.

BACKGROUND ART

In recent years, small electronic devices, represented by mobile terminals, have been widely used and urgently required to reduce the size and weight and to increase the life. Such requirement has advanced the development of particularly small, lightweight secondary batteries with higher energy density. These secondary batteries are considered to find application not only for small electronic devices but for large electronic devices such as, typically, automobiles as well as power storage systems such as, typically, houses.

Among those, lithium-ion secondary batteries are easy to reduce the size and increase the capacity and have higher energy density than those of lead or nickel-cadmium batteries, receiving considerable attention.

The lithium-ion secondary battery has positive and negative electrodes, a separator, and an electrolyte. The negative electrode includes a negative electrode active material related to charging and discharging reactions.

A negative electrode active material, which is usually made of a carbon material, is required to further improve the battery capacity for recent market requirement. Use of silicon as a negative electrode active material is considered to improve the battery capacity, for silicon has a logical capacity (4199 mAh/g) ten times larger than does graphite (372 mAh/g). Such a material is thus expected to significantly improve the battery capacity. The development of silicon materials for use as negative electrode active materials includes not only silicon as a simple but also alloy thereof and a compound thereof such as typically oxides. The consideration of active material shapes for carbon materials ranges from a standard application type to an integrated type in which the materials are directly accumulated on a current collector.

Use of silicon as a main material of a negative electrode active material, however, expands or shrinks a negative electrode active material when charging or discharging, thereby making the negative electrode active material easy to break particularly near its surface layer. In addition, this active material produces ionic substances in its interior and is thus easy to break. The breakage of the surface layer of the negative electrode active material creates a new surface, increasing a reaction area of the active material. The new surface then causes the decomposition reaction of an electrolyte and is coated with a decomposition product of the electrolyte, thereby consuming the electrolyte. This makes the cycle performance easy to reduce.

Various materials and configurations of a negative electrode for a lithium-ion secondary battery mainly using a silicon material have been considered to improve the initial efficiency and the cycle performance of the battery.

More specifically, a vapor deposition method is used to accumulate silicon and amorphous silicon dioxide simultaneously so that better cycle performance and greater safety are achieved (See Patent Document 1, for example). Moreover, a carbon material (an electronic conduction material) is disposed on the surface of silicon oxide particles so that a higher battery capacity and greater safety are achieved (See Patent Document 2, for example). Moreover, an active material including silicon and oxygen is produced to form an active material layer having a higher ratio of oxygen near a current collector so that improved cycle performance and higher input-output performance are achieved (See Patent Document 3, for example). Moreover, silicon active material is formed so as to contain oxygen with an average content of 40 at % or less and with a higher oxygen content near a current collector so that improved cycle performance is achieved (See Patent Document 4, for example).

Moreover, a nano-complex including-Si-phase, $SiO_2$, $M_yO$ metal oxide is used to improve the first charge and discharge efficiency (See Patent Document 5, for example). To improve the cycle performance, $SiO_x$ ($0.8 \leq x \leq 1.5$, the range of particle size=1 μm to 50 μm) and a carbon material are mixed and calcined at a high temperature (See Patent Document 6, for example). The active material is controlled by adjusting a mole ratio of oxygen to silicon in a negative electrode active material in the range from 0.1 to 1.2 so as to hold a difference between the maximum and the minimum of the oxygen-to-silicon mole ratio near the interface between the active material and a current collector at 0.4 or less, so that improved cycle performance is achieved (See Patent Document 7, for example). Moreover, a metal oxide containing lithium is used to improve the battery load characteristic (See Patent Document 8, for example). To improve the cycle performance, a hydrophobic layer such as a silane compound layer is formed on the surface of a silicon material (See Patent Document 9, for example).

Moreover, a silicon oxide is used and coated with graphite coating to give electric conductivity so that improved cycle performance is achieved (See Patent Document 10, for example). In Patent Document 10, the graphite coating exhibits a Raman spectrum that has broad peaks at shift values of 1330 $cm^{-1}$ and 1580 $cm^{-1}$, and their intensity ratio $I_{1330}/I_{1580}$ satisfies $1.5 < I_{1330}/I_{1580} < 3$. Similarly, a particle having a silicon microcrystal phase dispersed in a silicon dioxide is used to achieve a higher battery capacity and improved cycle performance (See Patent Document 11, for example). Moreover, a silicon oxide having a silicon-to-oxygen atomicity ratio of 1:y ($0 < y < 2$) is used to improve overcharge and overdischarge performance (See Patent Document 12, for example). Furthermore, a mixed electrode of silicon and carbon is produced with the silicon ratio set to 5 wt % or more and 13 wt % or less to achieve a higher battery capacity and improved cycle performance (See Patent Document 13, for example).

CITATION LIST

Patent Literature

Patent Document 1: Japanese Unexamined Patent publication (Kokai) No. 2001-185127
Patent Document 2: Japanese Unexamined Patent publication (Kokai) No. 2002-042806
Patent Document 3: Japanese Unexamined Patent publication (Kokai) No. 2006-164954

Patent Document 4: Japanese Unexamined Patent publication (Kokai) No. 2006-114454
Patent Document 5: Japanese Unexamined Patent publication (Kokai) No. 2009-070825
Patent Document 6: Japanese Unexamined Patent publication (Kokai) No. 2008-282819
Patent Document 7: Japanese Unexamined Patent publication (Kokai) No. 2008-251369
Patent Document 8: Japanese Unexamined Patent publication (Kokai) No. 2008-177346
Patent Document 9: Japanese Unexamined Patent publication (Kokai) No. 2007-234255
Patent Document 10: Japanese Unexamined Patent publication (Kokai) No. 2009-212074
Patent Document 11: Japanese Unexamined Patent publication (Kokai) No. 2009-205950
Patent Document 12: Japanese Patent No. 2997741
Patent Document 13: Japanese Unexamined Patent publication (Kokai) No. 2010-092830

SUMMARY OF INVENTION

Technical Problem

As described previously, small electronic devices, represented by mobile devices, have been developed to improve their performance and increase their functions in recent years. Lithium-ion secondary batteries, which are used as main sources of the devices, have been required to increase the battery capacity. The development of lithium-ion secondary batteries including negative electrodes mainly using silicon materials have been desired to solve this problem.

The lithium-ion secondary batteries using silicon materials is required to have the same battery performances as those of lithium-ion secondary batteries using carbon materials. Accordingly, the batteries have been improved in cycle retention rate and first efficiency by using silicon oxide modified by insertion and partial extraction of Li as a negative electrode active material. The modified silicon oxide is, however, modified by using Li, and the water repellency is relatively low thereby. This can cause unsatisfactory stabilization of slurry containing the modified silicon oxide, which is prepared in producing a negative electrode, to generate gas due to change of the slurry with time. Accordingly, it sometimes becomes impossible or hard to use apparatuses that, has been conventionally used for applying a carbon-based active material. As described above, when the silicon oxide is modified with Li to improve the initial efficiency and the cycle retention rate, the aqueous slurry using the same becomes insufficient in stability. Therefore, it has been failed to propose a negative electrode active material for a non-aqueous electrolyte secondary battery that is superior in industrial production of a secondary battery.

The present invention was accomplished in view of the above-described problems. It is an object of the present invention to provide a negative electrode active material for a non-aqueous electrolyte secondary battery that has high stability in aqueous slurry, high capacity, as well as good cycle performance and first efficiency.

Solution to Problem

To achieve the foregoing object, the present invention provides a negative electrode active material for a non-aqueous electrolyte secondary battery, including: negative electrode active material particles that contain a silicon compound ($SiO_x$: $0.5 \leq x \leq 1.6$) containing a Li compound,
wherein the silicon compound is at least partially coated with a carbon coating, and
at least a part of a surface of the silicon compound, a surface of the carbon coating, or both of them is coated with a composite layer that contains a composite composed of amorphous metal oxide and metal hydroxide.

The inventive negative electrode active material, having a composite layer that contains a composite composed of amorphous metal oxide and metal hydroxide on the outermost surface of the negative electrode active material particles that contains a silicon compound (hereinafter, also referred to as silicon-based active material particles), has high water repellency in aqueous slurry. When the composite is amorphous, Li can be transferred easily. The silicon compound in the present invention, having at least a part of the surface coated with a carbon coating, exhibits excellent electric conductivity. Accordingly, use of the inventive negative electrode active material enables advantageous industrial production of a non-aqueous electrolyte secondary battery having high battery capacity and good cycle retention rate, which reflect intrinsic features of the silicon oxide modified with Li.

It is preferred that the metal oxide and the metal hydroxide contain at least one element selected from the group consisting of aluminum, magnesium, titanium, and zirconium.

With the metal oxide and the metal hydroxide containing the metal element described above, the slurry becomes more stable in producing an electrode.

It is preferred that the composite layer have a thickness of 10 nm or less. It is particularly preferred that the composite layer have a thickness of 5 nm or less.

When the composite layer has a thickness of 10 nm or less, particularly 5 nm or less, the resistance of the silicon-based active material particles is not excessively high, and good battery performances can be obtained thereby.

It is preferred that the silicon compound contain $Li_2SiO_3$ as the Li compound.

Such Li silicate as $Li_2SiO_3$ is relatively stable as a Li compound, and can give more favorable battery performances.

It is preferred that the silicon compound have a peak attributable to $SiO_2$-region given in the chemical shift value of $-95$ to $-150$ ppm in a $^{29}Si$-MAS-NMR spectrum.

In such a silicon compound, the amount of Li compound such as Li silicate is not too large, and the $SiO_2$ component remains to some extent, which further improve the stability in slurry in producing an electrode.

It is preferred that the silicon compound satisfy a relationship of A>B where A and B are respectively an intensity of a peak attributable to $Li_2SiO_3$ given in the chemical shift value in the vicinity of $-75$ ppm and an intensity of a peak attributable to $SiO_2$-region given in the chemical shift value of $-95$ to $-150$ ppm in a $^{29}Si$-MAS-NMR spectrum.

When the silicon compound contains larger amount of $Li_2SiO_3$ on the basis of the $SiO_2$ component, the negative electrode active material can be more improved in the battery performances due to insertion of Li.

It is preferred that a test cell composed of a negative electrode produced by using a negative electrode active material in which the negative electrode active material for a non-aqueous electrolyte secondary battery and a carbon-based active material are mixed, together with a lithium counter electrode, exhibit a peak at an electric, potential V of the negative electrode ranging from 0.40 V to 0.55 v in discharging when the test cell is charged and discharged to graph a relationship between a derivative dQ/dV of a discharging capacity Q with respect to the electric potential V of the negative electrode on the basis of the lithium counter electrode, together with the electric potential V, where current flows in a direction in which the lithium of the negative electrode active material for a non-aqueous electrolyte secondary battery is extracted in the discharging.

The foregoing peak in the V-dQ/dV curve resembles a peak of silicon material, and the discharging curve rises sharply at higher electric potential, which make it easy to develop the capacity in designing a battery.

It is preferred that the silicon compound exhibit a diffraction peak having a half width (2θ) of 1.2° or more, the diffraction peak being attributable to a Si (111) crystal face and obtained by X-ray diffraction, and a crystallite size attributable to the crystal face be 7.5 nm or less.

The silicon-based active material that has the half width and the crystallite size described above, having low crystallinity and small amount of Si crystal, can improve the battery performances.

It is preferred that the silicon compound have a median size of 0.5 μm or more and 15 μm or less.

When the median size is 0.5 μm or more, the silicon compound has smaller area to cause side reaction on the surface, which allows the battery to retain the cycle retention rate higher without consuming excess Li. When the median size is 15 μm or less, the silicon compound expands more slightly in Li insertion and becomes hard to break and to form a crack. Moreover, the silicon compound slightly expands, which makes it harder to break a conventionally used negative electrode active material layer such as a layer in which a silicon-based active material is mixed with a carbon active material.

To achieve the foregoing objects, the present invention also provides a non-aqueous electrolyte secondary battery including any of the foregoing negative electrode active material for a non-aqueous electrolyte secondary battery.

The above secondary battery exhibits a high cycle retention rate and high first efficiency, and can be produced industrially advantageously.

To achieve the foregoing objects, the present invention further provides a method of producing a negative electrode material for a non-aqueous electrolyte secondary battery containing negative electrode active material particles, including the steps of:

producing silicon oxide particles shown by the general formula of $SiO_x$ (0.5≤x≤1.6), coating each surface of the silicon oxide particles with a carbon coating, subjecting the silicon oxide particles coated with the carbon coating to insertion and extraction of Li to modify the silicon oxide particles, and forming a composite layer that contains a composite composed of amorphous metal oxide and metal hydroxide to coat each surface of the modified silicon oxide particles with the composite layer, wherein the negative electrode material for a non-aqueous electrolyte secondary battery is produced by using the silicon oxide particles coated with the composite layer.

The above method of producing a negative electrode material for a non-aqueous electrolyte secondary battery can give a non-aqueous negative electrode material having high battery capacity and a good cycle retention rate, which reflect intrinsic features of the silicon oxide modified with Li. The negative electrode material produced in such a way contains silicon-based active material particles having a composite layer as described above, and accordingly, the slurry prepared in producing a negative electrode becomes stable. That is, it is possible to obtain a negative electrode material that can produce a secondary battery industrially advantageously.

It is preferred that the composite layer be formed on the surface of the modified, silicon oxide particles by hydrolysis and dehydration condensation of metal, alkoxide in the step of forming a composite layer.

This allows the metal alkoxide to occur hydrolysis and dehydration condensation successively to form the composite efficiently such that the metal oxide region and the metal hydroxide region coexist.

Advantageous Effects of Invention

The inventive negative electrode active material can improve the stability of slurry to be prepared in producing a secondary battery. The use of this slurry makes it possible to form a coating that can be used industrially to improve the battery capacity, cycle performance, and first charge and discharge property substantially. The inventive secondary battery containing this negative electrode active material can be produced industrially advantageously, thereby improving the battery capacity, cycle performance, and first charge and discharge property. The same effects can be obtained in an electronic apparatus, a machine tool, an electric vehicle, and a power storage system using the inventive secondary battery.

The inventive method, of producing a negative electrode material can produce a negative electrode material that can improve the stability of slurry to be prepared in producing a secondary battery and can improve the battery capacity, cycle performance, and first charge and discharge property.

BRIEF DESCRIPTION OF DRAWINGS

FIG. 1 is a schematic diagram showing a structure in the vicinity of a composite layer of silicon-based active material particles contained in the inventive negative electrode active material;

FIG. 2 is a sectional view showing a configuration of negative electrode that contains the inventive negative electrode active material;

FIG. 3 shows a bulk modification apparatus that can be used for producing a negative electrode active material of the present invention;

FIG. 4 is an exploded diagram showing an example of configuration of a lithium-ion secondary battery (a laminate film type) that contains the inventive negative electrode active material;

FIG. 5 is a $^{29}$Si-MAS-NMR spectrum measured for the silicon compound in Example 1-1.

DESCRIPTION OF EMBODIMENTS

Hereinafter, embodiments of the present invention will be described, but the present invention is not limited thereto.

As described previously, a negative electrode mainly made of a silicon-based active material has been investigated to be used as a negative electrode of a lithium-ion secondary battery to increase the capacity of the lithium-ion secondary battery. The lithium-ion secondary battery mainly using a silicon-based active material is required to have cycle performance and initial efficiency that are close to those of a lithium-ion secondary battery using a carbon material; however, it has been difficult to prepare stable slurry to produce a good negative electrode by using the silicon-based active material modified with Li in order to obtain cycle performance and initial efficiency that, are close to those of a lithium-ion secondary battery using a carbon material.

Accordingly, the inventors have diligently investigated to obtain a negative electrode active material that can easily produce a non-aqueous electrolyte secondary battery having a high battery capacity as well as good cycle performance and first efficiency.

The inventive negative electrode active material includes silicon-based active material particles that contain a silicon compound ($SiO_x$: $0.5 \leq x \leq 1.6$) containing a Li compound. In this negative electrode active material, the silicon compound is at least partially coated with a carbon coating. In this negative electrode active material, at least a part of the surface of the silicon compound, a surface of the carbon coating, or both of them are coated with a composite layer that contains a composite composed of amorphous metal oxide and metal hydroxide.

FIG. 1 shows a schema in the vicinity of a surface portion of the silicon compound 1. As shown in FIG. 1, the surface of the silicon compound 1 is coated with the carbon coating 2. Although the carbon coating is formed on a part of the surface of the silicon compound in FIG. 1, the carbon coating may be formed on the entire surface of the silicon compound. The surface of the silicon compound 1 and the surface of the carbon coating 2 are coated with the composite layer 3 that contains a composite composed of amorphous aluminum oxide and aluminum hydroxide. Although FIG. 1 exemplifies a case in which the composite of the composite layer 3 contains an aluminum element, the metal element is not particularly limited thereto and may include another element(s). In the example shown in FIG. 1, the composite layer 3 contains the aluminum oxide region 3a and the aluminum hydroxide region 3b.

These negative electrode active material, having a composite layer that contains a composite composed of amorphous metal oxide and metal hydroxide on the outermost, surface of the silicon-based active material particles, has high wetter repellency in an aqueous slurry. The aqueous slurry containing a silicon oxide modified by insertion and extraction of Li have been unsuitable for mass production previously, since it changes with time to generate gas. In the present, invention, however, the silicon-based active material particles have the above composite layer, thereby being hard to generate gas due to the change of slurry over time. This can give stable coating film and secure the integrity. When the composite is amorphous, Li can be transferred easily. The silicon compound in the present invention, having at least a part of the surface coated with a carbon coating, exhibits excellent electric conductivity. Accordingly, use of the inventive negative electrode active material enables advantageous industrial production of a non-aqueous electrolyte secondary battery having high battery capacity and good cycle retention rate, which reflect intrinsic features of the silicon oxide modified with Li.

[Configuration of Negative Electrode]

The following describes a configuration of a negative electrode of secondary battery containing the inventive negative electrode active material.

FIG. 2 shows a sectional view of negative electrode that contains the inventive negative electrode active material. As shown in FIG. 2, the negative electrode 10 is configured to have the negative electrode active material layer 12 on the negative electrode current collector 11. The negative electrode active material layer 12 may be disposed on one side or both sides of the negative electrode current collector 11. The negative electrode current collector 11 is not necessarily needed in a negative electrode of the inventive non-aqueous electrolyte secondary battery,

[Negative Electrode Current Collector]

The negative electrode current collector 11 is made of a highly electric conductive and mechanically strong material. Examples of the electric conductive material used for the negative electrode current collector 11 include copper (Cu) and nickel (Ni), Such electric conductive materials preferably have inability to form an intermetallic compound with lithium (Li).

The negative electrode current collector 11 preferably contains carbon (C) and sulfur (S) besides the main element because these elements improve the physical strength of the negative electrode current collector. In particular, when the active material layer is expandable at charging, the current collector containing the above elements can inhibit deformation of the electrodes and the current collector itself. The amount of the contained elements is preferably, but not particularly limited to, 100 ppm or less. This amount enables effective inhibition of the deformation.

The surface of the negative electrode current collector 11 may or may not be roughed. Examples of the negative electrode current collector roughened include a metallic foil subjected to an electrolyzing process, an embossing process, or a chemical etching process. Examples of the negative electrode current collector that is not roughened include a rolled metallic foil.

[Negative Electrode Active Material Layer]

The negative electrode active material layer 12 may contains a plurality of negative electrode active materials such as a carbon-based, active material in addition to the silicon-based active material particles, and may further contain other materials such as a thickener (also referred to as "a binding agent", "a binder") or a conductive additive depending on battery design. The form of negative electrode active material may be particle.

As described above, the inventive negative electrode active material contains silicon-based active material particles composed of $SiO_x$ ($0.5 \leq x \leq 1.6$). This silicon-based active material particles are made of a silicon oxide material ($SiO_x$: $0.5 \leq x \leq 1.6$), in which composition the x is preferably close to 1. The reason is that this composition enables high cycle performance. The present invention does not necessarily intend a silicon oxide material composition with a purity of 100% but permits a silicon oxide material containing a minute amount of impurities.

In the present invention, the silicon compound is favorable as the crystal Unity is lower. Specifically, it is desirable that the diffraction peak has a half width (2θ) of 1.2° or more, the diffraction peak being attributable to a (111) crystal face and obtained by X-ray diffraction of the silicon-based active material, and the crystallite size attributable to the crystal face is 7.5 nm or less. With lower crystal Unity and lower content of Si crystal as described above, it is possible to form a Li compound stably not only to improve the battery performances.

The median size of the silicon compound is preferably 0.5 μm or more and 15 μm or less, but not particularly limited thereto. This range makes it easy to occlude and emit lithium ions and inhibits the breakage of the silicon-based active material particles at charging and discharging. When this median size is 0.5 μm or more, a side reaction is hard to occur at charging and discharging since the surface area is prevented from excessively increasing, and accordingly, the battery irreversible capacity can be decreased. On the other hand, a median size of 15 μm or less is preferable since the breakage of the silicon-based active material particles and the creation of a new-surface are prevented.

In the present invention, the silicon-based active material preferably contains $Li_2SiO_3$ as the Li compound contained in the silicon compound. Such Li silicate as $Li_2SiO_3$ is relatively stable compared to other Li compounds, and accordingly, a silicon-based active material containing the Li compound(s) can give more stable battery performances. These Li compounds can be obtained by selectively changing a part of $SiO_2$ component formed in the silicon compound to a Li compound to modify the silicon compound.

The Li compound in the silicon compound can be quantified by Nuclear Magnetic Resonance (NMR) and X-ray Photoelectron Spectroscopy (XPS). XPS and NMR measurements can be performed, for example, under the following conditions.

XPS
Apparatus: an X-ray photoelectron spectroscopy apparatus
X-ray Source: a monochromatic Al-Kα ray
X-ray Spot Diameter: 100 μm
Ar-ion Sputtering Gun Conditions: 0.5 kV, 2 mm×2 mm
$^{29}$Si-MAS-NMR (magic angle spinning-Nuclear Magnetic Resonance)
Apparatus: a 700-NMR spectroscope made by Bruker Corp.
Probe: a 4-mm-HR-MAS rotor, 50 μL
Sample Rotation Speed: 10 kHz
Temperature of Measurement Environment: 25° C.

In the present invention, the silicon compound can be modified by using a method such as an electrochemical method, modification by oxidation and/or reduction reactions, and thermal doping, which is a physical method. The negative electrode active material is particularly improved in battery performances when the silicon compound is modified by using an electrochemical method and modification by oxidation and/or reduction. The modification is preferably performed by not only inserting Li into the silicon compound but also extracting Li from the silicon compound. This further improves the stability in slurry such as water repellency of the negative electrode active material.

In the inventive negative electrode active material, the silicon compound preferably has a peak attributable to $SiO_2$-region given in the chemical shift value of −95 to −150 ppm in a $^{29}$Si-MAS-NMR spectrum. With the modification in which $SiO_2$-region remained in the silicon compound to some extent as described above, without entirely changing the $SiO_2$-region to a Li compound, the stability in slurry is further improved.

In the inventive negative electrode active material, the silicon compound preferably satisfies a relationship of A>B where A and B are respectively an intensity of a peak attributable to $Li_2SiO_3$ given in the chemical shift value in the vicinity of −75 ppm and an intensity of a peak attributable to $SiO_2$-region given in the chemical shift value of −95 to −150 ppm in a $^{29}$Si-MAS-NMR spectrum. When the silicon compound contains relatively larger amount, of $Li_2SiO_3$ on the basis of the $SiO_2$ component, the battery performances can be more improved by insertion of Li.

As described above, the silicon-based active material particles have the surface of the silicon compound and the surface of the carbon coating coated with a composite layer that contains a composite composed, of amorphous metal oxide and metal hydroxide.

In particular, the composite composed of metal oxide and metal hydroxide is preferably formed by hydrolysis and dehydration condensation of metal alkoxide. This is because the metal oxide region and the metal hydroxide region coexist in the composite layer.

The metal oxide and the metal hydroxide preferably contain at least, any one element of aluminum, magnesium, titanium, and zirconium.

In particular, the composite layer preferably has a structure close to $Al(OH)_3$ at the outermost surface portion. This is because the slurry is more stabilized in producing a negative electrode.

It is particularly preferable to form the composite layer by sol-gel reaction process of aluminum isopropoxide. Such a method can coat the surface of the silicon-based active material with a thin composite layer that contains a composite composed of amorphous aluminum oxide and aluminum hydroxide.

The thickness of the composite layer is preferably 10 nm or less, and more preferably 5 nm or less. When the thickness of the composite layer is 10 nm or less, the electric resistance is not excessively high, though it depends on the composition of the mixture, and the battery performances are improved. The coating thickness of about 2 to 3 nm can further improve the stability in slurry while preventing an increase of electric resistance. Incidentally, the film thickness of the composite layer can be determined by using transmission electron microscope (TEM).

It is preferred that a test cell composed of a negative electrode produced by using a negative electrode active material in which the inventive negative electrode active material and a carbon-based active material are mixed, together with a lithium counter electrode, exhibit a peak at an electric potential V of the negative electrode ranging from 0.40 V to 0.55 V in discharging when the test cell is charged and discharged to graph a relationship between a derivative dQ/dV of a discharging capacity Q with respect to the electric potential V of the negative electrode on the basis of the lithium counter electrode, together with the electric potential V, where current flows in a direction in which the lithium of the negative electrode active material is extracted in the discharging. The foregoing peak in the V-dQ/dV curve resembles a peak of silicon material, and the discharging curve rises sharply at higher electric potential, which make it easy to develop the capacity in designing a battery.

[Method of Producing Negative Electrode]

The following describes an example of the inventive method of producing a negative electrode material for a non-aqueous electrolyte secondary battery.

First, a method, of producing a negative electrode material contained in the negative electrode will be described. The method begins with a production of silicon oxide particles expressed by $SiO_x$ (0.5≤x≤1.6). Subsequently, the silicon oxide particles are coated with a carbon coating. The silicon oxide particles are then modified by subjecting the silicon oxide particles to insertion and extraction of Li. At this stage, a Li compound can be formed either or both of the surface and the interior of each silicon oxide particles simultaneously. Then, each surface of the modified silicon oxide particles is coated with a composite layer that contains a composite composed of amorphous metal oxide and metal hydroxide. These silicon oxide particles can be used as negative electrode active material particles to produce a negative electrode material and a negative electrode through mixing with a conductive additive and a binder.

More specifically, the negative electrode material can be produced by, for example, the following procedure.

First, a raw material capable of generating a silicon oxide gas is heated under an inert gas atmosphere or a reduced pressure at a temperature ranging from 900° C. to 1600° C. to produce the silicon oxide, gas. The raw material is a mixture of metallic silicon powder and silicon dioxide powder. The mole ratio of the mixture preferably satisfies the relation of 0.8<metallic silicon powder/silicon dioxide powder<1.3, in consideration of the existence of oxygen on the metallic silicon powder surface and a minute amount of oxygen in a reactor. The Si-crystallites in the particles are controlled by adjustment of an arrangement range and a vaporization temperature, or heat treatment, after the production. The produced gas is deposited on an adsorption plate. The temperature in the reactor is decreased to 100° C. or less and then a deposit is taken out. The deposit is then pulverized, with a ball mill or a jet mill to form powder.

Then, the surface of the obtained powder material (silicon compound) is coated with a carbon coating. The carbon coating is effective to further improve the battery performances of the negative electrode active material.

Thermal CVD is desirable as a method to form the carbon coating on the surface of the powder material. This thermal CVD is to fill a furnace in which the silicon oxide powder is placed with a hydrocarbon gas and heat the interior of the furnace. The pyrolysis temperature is preferably, but not particularly limited to, 1200° C. or less, more preferably 950° C. or less. This range enables inhibition of unintended disproportionation of the silicon oxide. The hydrocarbon gas preferably has a composition of $C_nH_m$ where $3 \geq n$, but is not particularly limited thereto, for this composition enables reduction in production cost and improvement in properties of a pyrolysis product.

Subsequently, the bulk of the powder material is modified. The bulk modification is preferably performed by using an apparatus that can insert and extract Li in an electrochemical manner. Although apparatus structure is not particularly limited, bulk, modification can be performed with, for example, a bulk modification apparatus 20 shown in FIG. 3. The bulk modification apparatus 20 includes a bath 27 filled with an organic solvent 23, a positive electrode 21 (lithium source, modification source) provided within the bath 27 and connected to one terminal of a power source 26, a powder storage container 25 provided within the bath 27 and connected to the other terminal of the power source 26, and a separator 24 provided between the positive electrode 21 and the powder storage container 25. In the powder storage container 25, silicon oxide powder 22 is stored. After storing the silicon compound (silicon oxide particles) in the powder storage container, voltage is applied to the powder storage container storing the silicon oxide particles and the positive electrode (the lithium source) through a power source. This allows the silicon oxide particles to insert and extract lithium to modify the silicon oxide powder 22.

Examples of the organic solvent 23 in the bath 27 include ethylene carbonate, propylene carbonate, dimethyl carbonate, diethyl carbonate, ethylmethyl carbonate, fluoromethylmethyl carbonate, and difluoromethylmethyl carbonate. Examples of electrolyte salt contained in the organic solvent 23 include lithium hexafluorophosphate ($LiPF_6$) and lithium tetrafluoroborate ($LiBF_4$).

As the positive electrode 21, a Li foil or a. Li-containing compound may be used. Examples of the Li-containing compound include lithium carbonate, lithium oxide, lithium cobalt oxide, olivine iron lithium, lithium nickel oxide, and lithium vanadium phosphate.

The modification can be performed by using a thermal doping method. In this case, the modification can be performed by mixing the powder material, for example, with LiH powder or Li powder, followed by heating the mixture in a non-oxidative atmosphere. The non-oxidative atmosphere may be an Ar atmosphere. More specifically, the silicon oxide powder is sufficiently mixed with LiH powder or Li powder in an Ar atmosphere at first. This is sealed and is homogenized by agitating all of the sealed container. Then, this is heated in a range of 700° C. to 750° C. to perform the modification. In this case, Li can be removed from the silicon compound by using a method such as cleaning with alcohol, aqueous alkali, weak acid, and/or pure water after sufficiently cooling the heated powder.

Subsequently, each surface of the modified silicon oxide particles is coated with the composite layer that contains a composite composed of amorphous metal oxide and metal hydroxide. The composite layer is preferably formed by hydrolysis and dehydration condensation of metal alkoxide. This allows the metal alkoxide to occur hydrolysis and dehydration condensation successively to form the composite efficiently such that the metal oxide region and the metal hydroxide region coexist. More specifically, the composite layer can be formed by the following procedure, for example.

First, dehydrated ethanol, the modified silicon compound in an amount corresponding to a quarter of the mass of the dehydrated ethanol, and Al isopropoxide corresponding 1.5% by mass of the modified silicon compound are introduced in a vessel and stirred for 3.5 hours. After stirring, the ethanol is removed by vacuum filtration, and the silicon compound is dried in vacuum at 120° C. for 12 hours. At this stage, the film thickness of the composite layer can be controlled by changing the mass of Al isopropoxide, which is added simultaneously with the modifier.

Then, the silicon-based active material containing the silicon oxide particles having the composite layer is mixed with a carbon-based active material in accordance with needs. These negative electrode active materials are mixed with other materials such as a binder and a conductive additive to form a negative-electrode mixture, and organic solvent or water is added thereto to form slurry.

Subsequently, this slurry of negative-electrode mixture is applied onto the surface of the negative electrode current collector 11 and dried to form, the negative electrode active material layer 12 as shown in FIG. 2. At this stage, heat pressing and so on may be performed in accordance with needs. In this way, the negative electrode of the inventive non-aqueous electrolyte secondary battery can be produced.

<Lithium-Ion Secondary Battery>

Then, a lithium-ion secondary battery of a laminate film type will be described as an example of the inventive non-aqueous electrolyte secondary battery described above.

[Configuration of Laminate Film Secondary Battery]

The lithium-ion secondary battery 30 of a laminate film type shown in FIG. 4 includes a wound electrode body 31 interposed between sheet-shaped outer parts 35. This wound electrode body 31 is formed, by winding a positive electrode, a negative electrode, and a separator disposed between these electrodes. The electrode body may also be composed of a laminated part of the positive and negative electrodes, and a separator disposed between these electrodes. The electrode bodies of both types have a positive-electrode lead 32 attached to the positive electrode and a negative-electrode lead 33 attached to the negative electrode. The outermost circumference of the electrode bodies is protected by a protecting tape.

The positive-electrode lead and the negative-electrode lead 32 and 33, for example, extends from the interior of the outer parts 35 toward the exterior in one direction. The positive-electrode lead 32 is made of, for example, a conductive material such as aluminum; the negative-electrode lead 33 is made of, for example, a conductive material such as nickel or copper.

An example of the outer part 35 is a laminate film composed of a fusion-bond layer, a metallic layer, and a surface protecting layer stacked in this order. Two laminate films are fusion-bonded or stuck with an adhesive at the outer edge of their fusion-bond layers such that each fusion-bond layer faces the electrode body 31. The fusion-bond layer may be, for example, a film such as a polyethylene or polypropylene film; the metallic layer may be aluminum foil, for example; the protecting layer may be nylon for example.

The space between the outer parts 35 and the positive and negative electrode leads is filled with close adhesion films 34 to prevent air from entering therein. Exemplary materials of the close adhesion films include polyethylene, polypropylene, and polyolefin resins.

The positive electrode has a positive electrode active material layer disposed on one side or both sides of a positive electrode current collector as in the negative electrode 10 shown in FIG. 2, for example.

The positive electrode current collector is made of, for example, a conductive material such as aluminum.

The positive electrode active material layer contains any one kind or two kinds of positive electrode materials that can occlude and emit lithium ions, and may contain a positive electrode binder, a positive electrode conductive additive, a dispersing agent, or other materials according to design. The same detailed description as described for the negative electrode binders and negative electrode conductive additive, for example, is then given for the positive electrode binder and the positive electrode conductive additive.

The positive electrode material is preferably a compound containing lithium. Examples of the lithium-containing compound include a complex oxide composed of lithium and a transition metal element, and a phosphate compound containing lithium and a transition metal element. Among them, a compound containing at least one of nickel, iron, manganese, and cobalt is preferable for the positive electrode material. The chemical formula of this compound is expressed by, for example, $Li_xM_1O_2$ or $Li_yM_2PO_4$, where $M_1$ and $M_2$ represent at least one kind of transition metal elements, and x and y represent a value varied depending on a charging or discharging status of a battery, which typically satisfy $0.05 \leq x \leq 1.10$ and $0.05 \leq y \leq 1.10$.

Examples of the complex oxide composed of lithium and a transition metal element include a lithium cobalt complex oxide ($Li_xCoO_2$), a lithium nickel complex oxide ($Li_xNiO_2$), and a lithium-nickel-cobalt complex oxide. Examples of the lithium-nickel-cobalt complex oxide include lithium-nickel-cobalt-aluminum complex oxide (NCA) and lithium-nickel-cobalt-manganese complex oxide (NCM) are illustrated.

Examples of the phosphate compound containing lithium and a transition metal element include a lithium iron phosphate compound (LiFePCu), a lithium iron manganese phosphate compound ($LiFe_{1-u}Mn_uPO_4$ (0<u<1)). Use of these positive electrode materials enables a higher battery capacity and excellent cycle performance.

[Negative Electrode]

The negative electrode is configured as in the above negative electrode 10 for a lithium-ion secondary battery shown in FIG. 2, and, for example, has the negative electrode active material layers disposed on both faces of the current collector. The negative electrode preferably has a negative-electrode charge capacity larger than electrical capacitance (a battery charge capacity) provided by the positive electrode active material, for this negative electrode itself can inhibit the precipitation of lithium metal.

The positive electrode active material layer is formed partially on both faces of the positive electrode current collector. The same is true of the negative electrode active material layer. Such a negative electrode may have, for example, an area at which the positive electrode active material layer is not present on the surface of the positive electrode current collector that the negative electrode active material layer faces. This area permits stable battery design.

The above area at which the positive and negative electrode active material layers do not face one another is hardly affected by charging and discharging. The status of the negative electrode active material layer is consequently retained since its formation. This enables repeatable investigation of the composition of negative electrode active material with high precision without being affected by charging and discharging.

[Separator]

The separator separates the positive electrode and the negative electrode, prevents short circuit current due to contact of these electrodes, and passes lithium ions therethrough. This separator may be made of, for example, a porous film of synthetic resin or ceramics, or two or more stacked porous films. Examples of the synthetic resin include polytetrafluoroethylene, polypropylene, and polyethylene.

[Electrolyte]

A part of the active material layers or the separator is impregnated with a liquid electrolyte (an electrolyte solution). The electrolyte is composed of electrolyte salt dissolved in a solvent, and may contain other materials such as additives.

The solvent may be, for example, a non-aqueous solvent. Examples of the non-aqueous solvent include ethylene carbonate, propylene carbonate, butylene carbonate, dimethyl carbonate, diethyl carbonate, ethylmethyl carbonate, methylpropyl carbonate, 1,2-dimethoxyethane, and tetrahydrofuran. Among these, ethylene carbonate, propylene carbonate, dimethyl carbonate, diethyl carbonate, or ethylmethyl carbonate, or the combination thereof is preferable. Such solvent enables better performances. The combination of a viscous solvent, such as ethylene carbonate or propylene carbonate, and a non-viscous solvent, such as dimethyl carbonate, ethylmethyl carbonate, or diethyl carbonate allows much better performances, for such a solvent improves the dissociation of electrolyte salt and ionic mobility.

The solvent preferably contains an unsaturated carbon bond cyclic carbonate as an additive, for this enables the formation of a stable coating on a negative electrode at charging and discharging and the inhibition of a decomposition reaction of the electrolyte. Examples of the unsaturated carbon bond cyclic carbonate include vinylene carbonate and vinyl ethylene carbonate.

In addition, the solvent preferably contains sultone (cyclic sulfonic acid ester) as an additive, for this enables improvement in chemical stability of a battery. Examples of the sultone include propane sultone and propene sultone.

In addition, the solvent, preferably contains acid anhydride, for this enables improvement in chemical stability of the electrolyte. The acid anhydride may be, for example, propane disulfonic acid anhydride.

The electrolyte salt may contain, for example, at least one light metal salt such as lithium salt. Examples of the lithium salt include lithium hexafluorophosphate ($LiPF_6$), and lithium tetrafluoroborate ($LiBF_4$).

The content of the electrolyte salt in the solvent preferably ranges from 0.5 mol/kg or more and 2.5 mol/kg or less. This content enables high ionic conductivity.

[Method of Producing Laminate Film Secondary Battery]

Firstly, a positive electrode is produced with the above positive electrode material as follows. A positive electrode mixture is created by mixing the positive electrode active material with as necessary the positive electrode binder, the positive electrode conductive additive, and other materials, and dispersed in an organic solvent to form slurry of the positive-electrode mixture. The mixture slurry is then applied to a positive electrode current collector with a coating apparatus such as a die coater having a knife roll or a die head, and dried by hot air to obtain a positive electrode active material layer. The positive electrode active material layer is finally compressed with, for example, a roll press. The compression may be performed under heating. The compression may be repeated multiple times.

Secondly, a negative electrode active material layer is formed on a negative electrode current collector to produce a negative electrode through the same procedure as in the above production of the negative electrode 10 for a lithium-ion secondary battery.

In producing the positive electrode and the negative electrode, the active material layers are formed on both faces of the positive and negative electrode current collector. In both the electrodes, the length of these active material layers formed on the faces may differ from one another (See FIG. 2).

Then, an electrolyte is prepared. With ultrasonic welding, the positive electrode lead 32 is attached to the positive electrode current collector and the negative-electrode lead 33 is attached to the negative electrode current collector. The positive and negative electrodes and the separator interposed therebetween are stacked or wound to produce the wound, electrode body 31 and a protecting tape is stuck to the outermost circumference of the body. The electrode body is flattened. The film-shaped outer part 35 is folded in half to interpose the electrode body therebetween. The insulating portions of the outer part are stuck to one another by heat sealing such that one of the four sides is opened to house the wound electrode body. The close adhesion films are inserted between the outer part and the positive and negative electrode leads. The prepared electrolyte is introduced from the open side in a prescribed amount to perform the impregnation of the electrolyte under a vacuum. The open side is stuck by vacuum heat sealing. In this manner, the laminate film secondary battery 30 can be produced.

The inventive non-aqueous electrolyte secondary battery, such as the laminate film type secondary battery 30 produced in the above, preferably has a negative electrode utilization factor of 93% or more and 99% or less at charging and discharging. The secondary battery having a negative electrode utilization factor of 93% or more prevents reduction in the first charge/discharge efficiency and greatly improves the battery capacity; one having a negative electrode utilization factor of 99% or less prevents the precipitation of Li, thereby ensuring safety.

EXAMPLE

The present invention will be more specifically described below with reference to Examples of the present invention and Comparative Examples, but the present invention is not limited to these Examples.

Example 1-1

The laminate film secondary battery 30 shown in FIG. 4 was produced by the following procedure.

The procedure began with the production of a positive electrode. Positive electrode active materials of 95 mass parts of lithium-nickel-cobalt-aluminum complex oxide ($LiNi_{0.7}Co_{0.25}Al_{0.05}O$), 2.5 mass parts of a positive electrode conductive additive (acetylene black), and 2.5 mass parts of a positive electrode binder (polyvinylidene fluoride, PVDF) were mixed to produce a positive-electrode mixture. The positive-electrode mixture was dispersed in an organic solvent (N-methyl-2-pyrrolidone, NMP) to form paste slurry. The slurry was applied to both surfaces of a positive electrode current collector with a coating apparatus having a die head and dried with a drying apparatus of hot-air type. The positive electrode current collector used herein had a thickness of 15 μm. The resultant was finally compressed with a roll press.

Next, a negative electrode was produced. In the beginning, the silicon-based active material was produced by the following procedure. Firstly, a mixed raw material (a material to be vaporized) of metallic silicon and silicon dioxide was placed in a reaction furnace and evaporated under a vacuum atmosphere of 10 Pa to deposit the evaporated material on an adsorption plate. The deposit was sufficiently cooled and then taken out to pulverize the deposit with a ball mill. After adjusting the particle size, this was coated with a carbon coating by thermal CVD, Subsequently, this was mixed with LiH powder, the mass of which corresponded to 4% by mass of the silicon compound coated with the carbon coating, in an argon atmosphere, and the mixture was agitated by a shaker. Then, the agitated powder was modified by heat treatment at 740° C. in a controlled atmosphere furnace. Subsequently, the modified silicon oxide particles are introduced into a mixed solution of dehydrated ethanol and Al isopropoxide, and this was subjected to stirring, filtration, and drying to remove the ethanol. In this manner, a composite layer was formed containing a composite of aluminum oxide and aluminum hydroxide. The composite layer had a film thickness of 3 nm. In this case, the film thickness was calculated from the aluminum amount remained in the filtrate after the filtration.

The silicon-based active material produced as described above was blended with a carbon-based active material in a mass ratio of 1:9 to produce a negative electrode active material. The carbon-based, active material used herein was a mixture in which artificial graphite and natural graphite coated with a pitch layer was mixed in a mass ratio of 5:5. The carbon-based active material had a median size of 20 μm.

Then, the produced negative electrode active material, conductive additive-1 (carbon nanotube, CNT), conductive additive-2 (carbon fine particle with a median size of about 50 nm), styrene-butadiene rubber: (styrene-butadiene copolymer; hereinafter, referred to as SBR), and carboxymethyl cellulose (hereinafter, referred to as CMC) were mixed in a dry mass ratio of 92.5:1:1:2.5:3. This was diluted with pure water to form negative-electrode mixture slurry. Incidentally, the foregoing SBR and CMC were negative electrode binders (negative electrode binding agents). To measure the stability of the negative electrode material mixture slurry, 30 g of the produced negative electrode material mixture slurry was partly taken out separately from that for producing a secondary battery. This was stored at 20° C., and gas generating states were determined at 6 hours, 24 hours, 48 hours, 72 hours, and 1 week after preparing the negative electrode material mixture slurry.

As this negative electrode current collector, an electrolytic copper foil (thickness 15 μm) was used. Finally, the negative electrode mixture slurry was applied onto the negative electrode current collector, and subjected to drying at 100° C. for 1 hour under a vacuum. The negative electrode active material layer was deposited in a deposited amount per unit area on a face of the negative electrode after drying (referred to as an area density) of 5 mg/cm².

Subsequently, fluoroethylene carbonate (FEC), ethylene carbonate (EC), and diethyl carbonate (DEC) were mixed as a solvents, and electrolyte salt (lithium hexafluorophosphate ($LiPF_6$)) was dissolved to prepare an electrolytic solution. In this case, the solvent composition was set to EEC:EC:DEC=1:2:7 in a volume ratio, and the content of the electrolyte salt was set to 1.0 mol/kg based on the solvent. In addition, 1.5% by mass of vinylene carbonate (VC) was added to the obtained electrolytic solution.

Then, a secondary battery was assembled as follows. First, an aluminum lead was attached to one end of the positive electrode current collector with ultrasonic welding, and a nickel lead was welded to the negative electrode current collector. Subsequently, the positive electrode, a separator, the negative electrode, and a separator were laminated in this order, and wound in the longitudinal direction to produce a wound electrode body. The end of the winding was fixed with a PET protecting tape. The separator used herein was a laminate film with 12 μm in which a film mainly composed, of porous polyethylene was sandwiched by films mainly composed of porous polypropylene. Subsequently, the electrode body was interposed between outer parts, and then the outer edge of the outer parts was stuck to one another by heat sealing such that one of the four sides was opened to enter the electrode body therefrom. The outer part was an aluminum laminate film in which a nylon film, an aluminum foil, and a polypropylene film were laminated. Then, the electrolytic solution was introduced from the open side to perform the impregnation under a vacuum. The open side was then stuck by heat sealing.

On the secondary battery thus produced, the cycle performance and the first charge and discharge performance were evaluated.

The cycle performance was investigated in the following manner: First, two cycles of charging and discharging were performed at 0.2 C under an atmosphere of 25° C. to stabilize the battery and the discharge capacity in the second cycle was measured. Next, the cycle of charging and discharging was repeated until the total number of cycles reached 499 cycles and the discharge capacity was measured every cycle. Finally, a capacity retention rate (hereinafter, referred to as a retention rate simply) was calculated by dividing the discharge capacity in the 500-th cycle, which was obtained by charging and discharging at 0.2 C, by the discharge capacity in the second cycle. In the normal cycle, that is, in the cycles from the third cycle to 499-th cycle, the charging and discharging was performed at 0.7 C in charging and 0.5 C at discharging.

To investigate the first charge and discharge performance, a first efficiency (hereinafter, also referred to as an initial efficiency) was calculated. The first efficiency was calculated, from the expression shown by First Efficiency (%)= (First Discharge Capacity/First Charge Capacity)×100. The atmosphere temperate was the same as the cycle performance was investigated.

Examples 1-2 to 1-4

A secondary battery was produced as in Example 1-1 except that the types of the metal, oxide and metal hydroxide in the composite layer were changed to those containing an element shown in Table 1. The types of the metal oxide and metal hydroxide can be changed by changing the metal alkoxide used in the sol-gel reaction in forming the composite layer.

Comparative Example 1-1

A secondary battery was produced as in Example 1-1 except that the production of the silicon compound was not followed by any of the steps of forming a carbon coating, modifying the silicon compound, and forming a composite layer.

Comparative Example 1-2

A secondary battery was produced as in Example 1-1 except that the production of the silicon compound was not followed by modification of the silicon compound and formation of a composite layer, although formation of a carbon coating was performed.

Comparative Example 1-3

A secondary battery was produced as in Example 1-1 except that the production of the silicon compound was not followed by formation of a composite layer, although formation of the carbon coating and modification of the silicon compound were performed.

The silicon compound had the following properties in each of the foregoing Examples and Comparative Examples. In all of the Examples and Comparative Examples described above, the silicon compound shown by $SiO_x$ had a x value of 1.0, and the silicon compound had a median size $D_{50}$ of 4 μm. The unmodified silicon compound as in Comparative Example 1-1 and Comparative Example 1-2 exhibited a half width (2θ) of 2.593° in the diffraction peak attributable to a Si(111) crystal face and obtained by X-ray diffraction, and the crystallite size attributable to the Si(111) crystal face was 3.29 nm. Each modified silicon compound, other than in these Comparative Examples 1-1 and 1-2, exhibited a half width (2θ) of 2.257° in the diffraction peak attributable to a Si(111) crystal face and obtained by X-ray diffraction, and the crystallite size attributable to the Si(111) crystal face was 3.77 nm. This is due to a part of the silicon compound which caused disproportionation to be crystallized since thermal doping was used for the modification. The modified silicon compound contained $Li_2SiO_3$.

In Examples 1-1 to 1-4 and Comparative Examples 1-2 and 1-3, the amount of the carbon coating was 5% by mass with respect to the total amount of the silicon compound and the carbon coating. In all of the Examples and Comparative Examples described above, the $^{29}Si$-MAS-NMR spectrum exhibited a peak attributable to $SiO_2$-region given in the chemical shift value of −95 to −150 ppm. In Comparative Example 1-1 and Comparative Example 1-2, each silicon compound exhibited a relationship of A<B where A and B are respectively an intensity of a peak attributable to $Li_2SiO_3$ given in the chemical shift value in the vicinity of −75 ppm and an intensity of a peak attributable to the $SiO_2$-region in a $^{29}Si$-MAS-NMR spectrum. In other Examples and Comparative Example, each foregoing relationship was A>B. FIG. 5 is a 23Si-MAS-NMR spectrum obtained in Example 1-1.

The negative electrode prepared as described above was used for producing a test cell in a coin battery shape with a size of 2032 together with a lithium, counter electrode, and the discharging behavior was evaluated. More specifically, the test cell was charged at first with a constant current and constant voltage until the voltage reached 0 V on the basis of the Li counter electrode, and the charging was stopped at the current density reached 0.05 mA/cm². The test cell was then discharged with a constant current until the voltage reached 1.2 V. At this time, the current density was 0.2 mA/cm². The data obtained by the foregoing charging and discharging were plotted, on a graph of capacity change (dQ/dV) as the ordinate and the voltage (V) as the abscissa to determine whether a peak was obtained or not at the V in a range of 0.4 to 0.55 (V). As the result, the peak was determined in all Examples and Comparative Example except Comparative Examples 1-1 and 1-2.

Table 1 shows evaluation results of Examples 1-1 to 1-4 and Comparative Examples 1-1, 1-2, and 1-3.

since the silicon-based active material particles had a carbon coating, but the values were not sufficient.

Examples 2-1 and 2-2 and Comparative Examples 2-1 and 2-2

A secondary battery was produced as in Example 1-1 except that the oxygen, content in the bulk of the silicon compound was adjusted. In this case, the oxygen content was adjusted by changing the ratio in the raw material to be vaporized and the temperature. Table 2 shows each value in the silicon compound expressed by $SiO_x$ in Examples 2-1 and 2-2 and Comparative Examples 2-1 and 2-2.

TABLE 1

SiOx x = 1 $D_{50}$ = 4 μm, Graphite (natural graphite:artificial graphite = 5:5) $D_{50}$ = 20 μm, SiOx ratio 10% by mass (in a ratio of active material), $SiO_2$ contained

| | Composite layer metal | Composite layer thickness (nm) | $Li_2SiO_3$ | Carbon coating | dQ/dV peak | Half width 2θ (°) | Si(111) crystallite size (nm) | Modification method | A B | Retention rate (%) | First efficiency (%) | Gas generation |
|---|---|---|---|---|---|---|---|---|---|---|---|---|
| Comparative Example 1-1 | None | None | None | None | None | 2.593 | 3.29 | Not treated | A < B | 78.0 | 81.2 | Not generated |
| Comparative Example 1-2 | None | None | None | Exist | None | 2.593 | 3.29 | Not treated | A < B | 79.0 | 83.5 | Not generated |
| Comparative Example 1-3 | None | None | Exist | Exist | Exist | 2.257 | 3.77 | Thermal doping | A > B | 80.0 | 88.5 | 6 hours |
| Example 1-1 | Al | 3 | Exist | Exist | Exist | 2.257 | 3.77 | Thermal doping | A > B | 81.0 | 88.5 | 1 week |
| Example 1-2 | Ti | 3 | Exist | Exist | Exist | 2.257 | 3.77 | Thermal doping | A > B | 80.5 | 88.5 | 72 hours |
| Example 1-3 | Mg | 3 | Exist | Exist | Exist | 2.257 | 3.77 | Thermal doping | A > B | 80.5 | 88.5 | 48 hours |
| Example 1-4 | Zr | 3 | Exist | Exist | Exist | 2.257 | 3.77 | Thermal doping | A > B | 81.0 | 88.5 | 72 hours |

In each secondary battery using the inventive negative electrode active material, the battery performances such as the cycle performance and the first efficiency were improved by modification using Li, and generation of gas could be prevented considerably as in Examples 1-1 to 1-4 shown in Table 1. Particularly, gas generation was not determined until 1 week had passed after preparing the slurry in Example 1-1.

On the other hand, in Comparative Example 1-3, without forming a composite layer on the modified silicon-based active material particles, gas had generated when 6 hours had passed after preparing the slurry. As described above, determination of gas generation was not performed in a period from immediately after preparing the slurry till 6 hours had passed from the preparation. Accordingly, it is presumed that gas generated within 6 hours after preparing the slurry in Comparative Example 1-3. It is difficult to treat slurry in which gas has generated since it lowers the peel strength with a copper foil (a current collector). In industrial preparation of an electrode, slurry is required to have a pot life of 6 hours at least. Accordingly, the negative electrode active material of Comparative Example 1-3 cannot be served for industrial production. In Comparative Examples 1-1 and 1-2, without modification, the battery performances were inferior to those of Examples although gas was not generated. In Comparative Example 1-2, the battery performances were better than those in Comparative Example 1-1

TABLE 2

$D_{50}$ = 4 μm, Graphite (natural graphite: artificial graphite = 5:5) $D_{50}$ = 20 μm, SiOx ratio 10% by weight (in a ratio of active material), $SiO_2$ contained, Metal material in the composite layer Al 3 nm, $Li_2SiO_3$ contained, Carbon coating 5% by mass, dQ/dV determined, Half width 2.257°, Crystallite 3.77 nm, Modification method: thermal doping, A > B

| | x | Retention rate (%) | First efficiency (%) | Gas generation |
|---|---|---|---|---|
| Comparative Example 2-1 | 0.3 | 65.0 | 89.1 | 1 week |
| Example 2-1 | 0.5 | 80.0 | 88.7 | 1 week |
| Example 2-2 | 1.6 | 80.0 | 88.3 | 48 hours |
| Comparative Example 2-2 | 1.8 | 69.0 | 85.5 | 24 hours |

When the oxygen amount was decreased in the silicon compound, that is, when x<0.5, the dominant Si caused to lower the cycle retention rate largely. When the oxygen was dominant, that is, when x>1.6, the silicon oxide exhibited higher resistance to lower the cycle retention rate largely.

Examples 3-1 to 3-6

A secondary battery was produced as in Example 1-1 except that the film thickness of the composite layer was changed as shown in Table 3, The film thickness was controlled by changing the mass ratio of Al isopropoxide with respect to the dehydrated ethanol and the modified silicon compound. Incidentally, the film thickness was calculated from the aluminum amount remained in the filtrate after the filtration, though it can be measured by using TEM. On the film thickness (3 nm) in Example 3-3, the picture was also determined by using TEM to confirm that the calculated value of the film thickness obtained by the foregoing calculation method was almost the same as the value of film thickness measured by using TEM.

TABLE 3

SiO$x$ $x$ = 1 $D_{50}$ = 4 μm, Graphite (natural graphite: artificial graphite = 5:5) $D_{50}$ = 20 μm, SiO$x$ ratio 10% by mass (in a ratio of active material), SiO$_2$ contained, Metal material in the composite layer Al, Li$_2$SiO$_3$ contained, Carbon coating 5% by mass, dQ/dV determined, Half width 2.257°, Crystallite 3.77 nm, Modification method: thermal doping, A > B

|  | Film thickness (nm) | Retention rate (%) | First efficiency (%) | Gas generation |
|---|---|---|---|---|
| Example 3-1 | 1 | 80.5 | 88.5 | 24 hours |
| Example 3-2 | 2 | 81.0 | 88.5 | 48 hours |
| Example 3-3 | 3 | 81.0 | 88.5 | 1 week |
| Example 3-4 | 5 | 81.0 | 88.5 | 1 week |
| Example 3-5 | 10 | 80.5 | 88.5 | 1 week |
| Example 3-6 | 15 | 80.0 | 88.5 | 1 week |

As can be seen from Table 3, it was found that gas generation was sufficiently prevented and the battery performances were sufficiently improved when the composite layer had the thickness of 10 nm or less. It was also found that the battery performances were improved remarkably when the composite layer had the thickness of 5 nm or less, particularly 2 to 3 nm.

Examples 4-1 and 4-5

A secondary battery was produced as in Example 1-1 except that the film thickness of the composite layer was changed as shown in Table 4, and the modification was performed in an electrochemical method. More specifically, bulk modification was performed by using an electrochemical method in a mixed solvent, of ethylene carbonate and dimethyl carbonate in a volume ratio of 3:7 (containing electrolyte salt in a concentration of 1.3 mol/kg) in the apparatus shown in FIG. 3.

TABLE 4

SiO$x$ $x$ = 1 $D_{50}$ = 4 μm, Graphite (natural graphite: artificial graphite = 5:5) $D_{50}$ = 20 μm, SiO$x$ ratio 10% by mass (in a ratio of active material), SiO$_2$ contained, Metal material in the composite layer Al, Li$_2$SiO$_3$ contained, Carbon coating 5% by mass, dQ/dV determined, Half width 2.593°, Crystallite 3.29 nm, Modification method: electrochemical method, A > B

|  | Film thickness (nm) | Retention rate (%) | First efficiency (%) | Gas generation |
|---|---|---|---|---|
| Example 4-1 | 1 | 82.5 | 86.5 | 48 hours |
| Example 4-2 | 2 | 83.0 | 86.5 | 72 hours |
| Example 4-3 | 3 | 83.0 | 86.5 | 1 week |
| Example 4-4 | 5 | 83.0 | 86.5 | 1 week |
| Example 4-5 | 10 | 82.5 | 86.5 | 1 week |

As shown in Table 4, it was found that the composite layer having the thickness of 10 nm or less was fully effective in preventing gas generation and improving the battery performances even when an electrochemical method was used as the modification method. It was found that the battery performances were improved remarkably when the composite layer had the thickness of 5 nm or less, particularly 2 to 3 nm also in this case.

Examples 5-1 and 5-2

A secondary battery was produced as in Example 1-1 except for using a silicon compound without having a peak attributable to SiO$_2$-region given in the chemical shift value of −95 to −150 ppm in a $^{29}$Si-MAS-NMR spectrum. The intensity of the peak attributable to SiO$_2$-region was decreased largely by increasing the Li amount, in the modification. Subsequently, Li was extracted from the silicon compound in an extent of forming slurry to prepare a silicon-based active material without having SiO$_2$-region that can be determined by NMR.

In Example 5-2, the modification method was also changed to an electrochemical method.

TABLE 5

SiO$x$ $x$ = 1 $D_{50}$ = 4 μm, Graphite (natural graphite:artificial graphite = 5:5) $D_{50}$ = 20 μm, SiO$x$ ratio 10% by mass (in a ratio of active material), Metal material in the composite layer Al 3 nm, Li$_2$SiO$_3$ contained, Carbon coating 5% by mass, dQ/dV determined, A > B

|  | SiO$_2$ peak | Half width 2θ (°) | Crystallite size (nm) | Modification method | Retention rate (%) | First efficiency (%) | Gas generation |
|---|---|---|---|---|---|---|---|
| Example 5-1 | None | 2.257 | 3.77 | Thermal doping | 80.0 | 88.5 | 24 hours |
| Example 5-2 | None | 2.593 | 3.29 | Electorochemical | 81.0 | 86.5 | 48 hours |

In Examples 5-1 and 5-2, gas generation was determined after 24 hours and after 48 hours, respectively. On the other hand, in Example 1-1, the slurry of which was prepared, under the same conditions as in Example 5-1 except for the existence or nonexistence of a peak attributable to SiO$_2$-region measured by NMR; and in Example 3-3, the slurry of which was prepared under the same conditions as in Example 5-2 except for the existence or nonexistence of the foregoing peak, gas generation was determined after 1 week as described above. This reveals that the effect for preventing gas generation is more remarkable when the silicon-based active material contains $SiO_2$-region that can be determined by NMR. It was also determined that gas generation could be prevented considerably compared to a previous art, such as the gas generation time of 24 hours or more, by forming a composite layer as in the present invention even when, the stability in slurry could be relatively lower due to large amount of Li compound as in Examples 5-1 and 5-2.

Example 6-1

A secondary battery was produced as in Example 1-1 except for using a silicon compound in which the relationship of intensity A of a peak attributable to $Li_2SiO_3$ and intensity B of a peak attributable to the $SiO_2$-region was A<B. In this case, the intensity A attributable to $Li_2SiO_3$ was decreased by reducing the Li amount in modification to decrease the amount of $Li_2SiO_3$.

TABLE 6

SiOx x = 1 $D_{50}$ = 4 μm, Graphite (natural graphite:
artificial graphite - 5:5) $D_{50}$ = 20 μm, SiOx ratio
10% by mass (in a ratio of active material), $SiO_2$ contained, Metal material
in the composite layer Al 3 nm, $Li_2SiO_3$ contained, Carbon coating
5% by mass, dQ/dV determined, Half width 2.257°, Crystallite
3.77 nm, Modification method: thermal doping

| | A B | Retention rate (%) | First efficiency (%) | Gas generation |
|---|---|---|---|---|
| Example 6-1 | A < B | 81.0 | 85.8 | 1 week |

When the silicon compound remained larger amount of silicon oxide region, which could be determined by NMR, gas generation got milder (gas generation was further prevented). In this Example, the gas generation time was evaluated as 1 week, which is the same as in Example 1-1 satisfying the relation of peak intensity of A>B, depending on the measuring method. It is presumed that, however, the actual time to start gas generation in Example 6-1 was longer than the time to start gas generation in Example 1-1, In Example 6-1, however, the initial efficiency was slightly lowered compared to that of Example 1-1.

Example 7-1

A secondary battery was produced as in Example 1-1 except for using a silicon-based active material which did not exhibit a peak at the V in a range of 0.40 V to 0.55 V in the V-dQ/dV curve.

TABLE 7

SiOx x = 1 $D_{50}$ = 4 μm, Graphite (natural
graphite: artificial graphite = 5:5) $D_{50}$ = 20 μm,
SiOx ratio 10% by mass (in a ratio of active material), $SiO_2$ contained,
Metal material in the composite layer Al 3 nm, $Li_2SiO_3$ contained,
Carbon coating 5% by mass, Half width 2.257°, Crystallite
3.77 nm, Modification method: thermal doping, A >
B

| | dQ/dV peak | Retention rate (%) | First efficiency (%) | Gas generation |
|---|---|---|---|---|
| Example 7-1 | None | 81.0 | 87.9 | 1 week |

To obtain a discharging curve which rises more sharply, the silicon compound (SiOx) have to exhibit the same discharging behavior as that of silicon (Si). When there was no peak in the foregoing range, the silicon compound exhibited a relatively gently-sloping discharging curve to cause the initial efficiency to be slightly lower in the assembled cell.

Examples 8-1 to 8-9

A secondary battery was produced as in Example 1-1 except for changing the crystallinity of the silicon compound. The crystallinity of the silicon compound is adjustable by the heat treatment under non-atmospheric ambience after preparing the silicon compound. Incidentally, in the modification by thermal doping method, a certain amount of heat is applied to the silicon compound. Accordingly, the modification was performed by an electrochemical method in Examples 8-8 and 8-9 to retain the low crystallinity in materials which were close to amorphous.

TABLE 8

SiOx x = 1 $D_{50}$ = 4 μm, Graphite (natural graphite:artificial
graphite = 5:5) $D_{50}$ = 20 μm, SiOx ratio 10% by mass (in a ratio
of active material), $SiO_2$ contained, Metal material in the
composite layer Al 3 nm, $Li_2SiO_3$ contained, Carbon coating 5% by
mass, A > B

| | Half width 2θ (°) | Crystallite size (nm) | Modification method | Retention rate (%) | First efficiency (%) | Gas generation |
|---|---|---|---|---|---|---|
| Example 8-1 | 0.756 | 11.42 | Thermal doping | 78.0 | 88.8 | 1 week |
| Example 8-2 | 0.796 | 10.84 | Thermal doping | 78.0 | 88.8 | 1 week |
| Example 8-3 | 1.025 | 8.55 | Thermal doping | 79.0 | 88.7 | 1 week |
| Example 8-4 | 1.218 | 7.21 | Thermal doping | 79.0 | 88.6 | 1 week |
| Example 8-5 | 1.271 | 6.63 | Thermal doping | 79.0 | 88.6 | 1 week |
| Example 8-6 | 1.845 | 4.62 | Thermal doping | 80.0 | 88.6 | 1 week |
| Example 3-3 | 2.257 | 3.77 | Thermal doping | 81.0 | 88.5 | 1 week |
| Example 8-7 | 2.593 | 3.29 | Thermal doping | 81.5 | 88.5 | 1 week |
| Example 8-8 | 10.123 | 1.524 | Electrochemical | 84.0 | 88.5 | 1 week |
| Example 8-9 | 20.221 | 0 | Electrochemical | 84.5 | 88.4 | 1 week |

A higher retention rate was obtained particularly when using a low crystalline material in which the half width (2θ) was 1.2° or more, and the crystallite size attributable to a Si (111) crystal face was 7.5 nm or less.

Examples 9-1 to 9-6

A secondary battery was produced as in Example 1-1 except for changing the median size of the silicon compound as shown in Table 9.

TABLE 9

SiOx x = 1 $D_{50}$ = 4 μm, Graphite (natural graphite:
artificial graphite = 5:5) $D_{50}$ = 20 μm, SiOx ratio 10%
by mass (in a ratio of active material), SiO2 contained, Metal material
in the composite layer Al 3 nm, $Li_2SiO_3$ contained, Carbon coating
5% by mass, A > B, Half width 2.593°, Crystallite 3.29
nm, dQ/dV determined, Modification method: thermal doping

|  | Median size (nm) | Retention rate (%) | First efficiency (%) | Gas generation |
| --- | --- | --- | --- | --- |
| Example 9-1 | 0.1 | 78.0 | 88.1 | 1 week |
| Example 9-2 | 0.5 | 80.0 | 88.2 | 1 week |
| Example 9-3 | 1.0 | 80.5 | 88.3 | 1 week |
| Example 9-4 | 10 | 80.5 | 88.6 | 1 week |
| Example 9-5 | 15 | 80.5 | 88.6 | 1 week |
| Example 9-6 | 20 | 79.0 | 88.3 | 1 week |

The retention rate was improved when the silicon compound had a median size of 0.5 μm or more. It is considered that this is because the surface area of the silicon compound was not excessively large, and the area to cause side reaction was decreased thereby. On the other hand, loss of reversible Li could be prevented when the median size was 15 μm or less since the particles were hard to break at charging, and the solid electrolyte interface (SEI) due to the new surface was hard to occur at charging and discharging.

It is to be noted that the present invention is not limited to the foregoing embodiment. The embodiment is just an exemplification, and any examples that have substantially the same feature and demonstrate the same functions and effects as those in the technical concept described in claims of the present invention are included in the technical scope of the present invention.

The invention claimed is:

1. A negative electrode active material for a non-aqueous electrolyte secondary battery, comprising:
    negative electrode active material particles that contain a silicon compound ($SiO_x$: 0.5≤x≤1.6) containing a Li compound,
    wherein the silicon compound is at least partially coated with a carbon coating, and
    at least a part of a surface of the silicon compound, a surface of the carbon coating, or both of them is coated with a composite layer that contains a composite composed of amorphous metal oxide and metal hydroxide.

2. The negative electrode active material for a non-aqueous electrolyte secondary battery according to claim 1, wherein the metal oxide and the metal hydroxide contain at least one element selected from the group consisting of aluminum, magnesium, titanium, and zirconium.

3. The negative electrode active material for a non-aqueous electrolyte secondary battery according to claim 1, wherein the composite layer has a thickness of 10 nm or less.

4. The negative electrode active material for a non-aqueous electrolyte secondary battery according to claim 2, wherein the composite layer has a thickness of 10 nm or less.

5. The negative electrode active material for a non-aqueous electrolyte secondary battery according to claim 3, wherein the composite layer has a thickness of 5 nm or less.

6. The negative electrode active material for a non-aqueous electrolyte secondary battery according to claim 4, wherein the composite layer has a thickness of 5 nm or less.

7. The negative electrode active material for a non-aqueous electrolyte secondary battery according to claim 1, wherein the silicon compound contains $Li_2SiO_3$ as the Li compound.

8. The negative electrode active material for a non-aqueous electrolyte secondary battery according to claim 2, wherein the silicon compound contains $Li_2SiO_3$ as the Li compound.

9. The negative electrode active material for a non-aqueous electrolyte secondary battery according to claim 3, wherein the silicon compound contains $Li_2SiO_3$ as the Li compound.

10. The negative electrode active material for a non-aqueous electrolyte secondary battery according to claim 4, wherein the silicon compound contains $Li_2SiO_3$ as the Li compound.

11. The negative electrode active material for a non-aqueous electrolyte secondary battery according to claim 5, wherein the silicon compound contains $Li_2SiO_3$ as the Li compound.

12. The negative electrode active material for a non-aqueous electrolyte secondary battery according to claim 6, wherein the silicon compound contains $Li_2SiO_3$ as the Li compound.

13. The negative electrode active material for a non-aqueous electrolyte secondary battery according to claim 1, wherein the silicon compound has a peak attributable to $SiO_2$-region given in the chemical shift value of −95 to −150 ppm in a $^{29}$Si-MAS-NMR spectrum.

14. The negative electrode active material for a non-aqueous electrolyte secondary battery according to claim 1, wherein the silicon compound satisfies a relationship of A>B where A and B are respectively an intensity of a peak attributable to $Li_2SiO_3$ given in the chemical shift value in the vicinity of −75 ppm and an intensity of a peak attributable to $SiO_2$-region given in the chemical shift value of −95 to −150 ppm in a $^{29}$Si-MAS-NMR spectrum.

15. The negative electrode active material for a non-aqueous electrolyte secondary battery according to claim 1, wherein
    a test cell composed of a negative electrode produced by using a negative electrode active material in which the negative electrode active material for a non-aqueous electrolyte secondary battery and a carbon-based active material are mixed, together with a lithium counter electrode, exhibits a peak at an electric potential V of the negative electrode ranging from 0.40 V to 0.55 V in discharging when the test cell is charged and discharged to graph a relationship between a derivative dQ/dV of a discharging capacity Q with respect to the electric potential V of the negative electrode on the basis of the lithium counter electrode, together with the electric potential V, where current flows in a direction in which the lithium of the negative electrode active material for a non-aqueous electrolyte secondary battery is extracted in the discharging.

16. The negative electrode active material for a non-aqueous electrolyte secondary battery according to claim 1, wherein the silicon compound exhibits a diffraction peak having a half width (2θ) of 1.2° or more, the diffraction peak being attributable to a Si(111) crystal face and obtained by X-ray diffraction, and a crystallite size attributable to the crystal face is 7.5 nm or less.

17. The negative electrode active material for a non-aqueous electrolyte secondary battery according to claim 1, wherein the silicon compound has a median size of 0.5 µm or more and 15 µm or less.

18. A non-aqueous electrolyte secondary battery comprising the negative electrode active material for a non-aqueous electrolyte secondary battery according to claim 1.

19. A method of producing a negative electrode material for a non-aqueous electrolyte secondary battery containing negative electrode active material particles, comprising the steps of:
 producing silicon oxide particles shown by the general formula of $SiO_x$ ($0.5 \leq x \leq 1.6$),
 coating each surface of the silicon oxide particles with a carbon coating,
 subjecting the silicon oxide particles coated with the carbon coating to insertion and extraction of Li to modify the silicon oxide particles, and
 forming a composite layer that contains a composite composed of amorphous metal oxide and metal hydroxide to coat each surface of the modified silicon oxide particles with the composite layer,
 wherein the negative electrode material for a non-aqueous electrolyte secondary battery is produced by using the silicon oxide particles coated with the composite layer.

20. The method of producing a negative electrode material for a non-aqueous electrolyte secondary battery according to claim 19, wherein the composite layer is formed on the surface of the modified silicon oxide particles by hydrolysis and dehydration condensation of metal alkoxide in the step of forming a composite layer.

* * * * *